United States Patent

Nakata et al.

[11] Patent Number: 5,279,273
[45] Date of Patent: Jan. 18, 1994

[54] EGR APPARATUS FOR AN INTERNAL COMBUSTION ENGINE

[75] Inventors: Kunihiko Nakata, Susono; Shunichi Ide, Toyota; Mamoru Yoshioka, Susono; Shigeru Yoshiyama, Kariya, all of Japan

[73] Assignee: Toyota Jidoshia Kabushiki Kaisha, Aichi, Japan

[21] Appl. No.: 43,326

[22] Filed: Apr. 6, 1993

[30] Foreign Application Priority Data

Apr. 10, 1992 [JP] Japan .................. 4-116672

[51] Int. Cl.$^5$ .................................... F02M 25/07
[52] U.S. Cl. ................................................ 123/571
[58] Field of Search .................... 123/568, 569, 571

[56] References Cited

U.S. PATENT DOCUMENTS

| | | | |
|---|---|---|---|
| 4,233,947 | 11/1980 | Abo | 123/571 |
| 4,281,631 | 8/1981 | Yamaguchi | 123/571 |
| 4,378,776 | 4/1983 | Nishimori | 123/571 |
| 4,432,330 | 2/1984 | Otsuka | 123/571 |
| 4,454,853 | 6/1984 | Hasegawa | 123/571 |
| 4,467,775 | 8/1984 | Buck et al. | 123/571 |
| 4,665,882 | 5/1987 | Otobe | 123/571 |
| 4,736,728 | 4/1988 | Takahashi et al. | 123/571 |
| 5,113,835 | 5/1992 | Seki et al. | 123/571 |

FOREIGN PATENT DOCUMENTS 60-1368 1/1985 Japan .
1-130051 5/1989 Japan .

Primary Examiner—Willis R. Wolfe
Attorney, Agent, or Firm—Kenyon & Kenyon

[57] ABSTRACT

An EGR apparatus includes an EGR conduit, an EGR valve, a first passage connecting a portion of an intake conduit downstream of a throttle valve and the EGR valve, and a second passage connecting a portion of the intake conduit upstream of the throttle valve and a medium portion of the first passage. A two-way solenoid valve is installed in the first passage between the intake conduit and a connecting portion where the first passage and the second passage join. Further, a fixed throttle is disposed in the second passage. By removing a VCV of a conventional EGR apparatus from the EGR apparatus and by replacing a three-way VSV of the conventional apparatus with a combination of the two-way solenoid valve and the fixed throttle, a problem of non-cutting of EGR, which can occur in the conventional apparatus, does not occur in the EGR apparatus of the invention.

10 Claims, 3 Drawing Sheets 5,279,273

EGR APPARATUS FOR AN INTERNAL COMBUSTION ENGINE

BACKGROUND OF THE INVENTION

1. Field of the Invention

The present invention relates to an exhaust gas recirculation (EGR) apparatus for an internal combustion engine, and more particularly relates to an apparatus wherein, even if a solenoid valve causes a failure in an open condition thereof, exhaust gas recirculation is automatically cut at an idling condition of the engine to thereby prevent engine stall at the idling condition.

2. Description of the Related Art

An EGR apparatus is provided to an internal combustion engine to suppress exhaust of nitrogen oxides to the atmosphere. FIG. 3 illustrates an EGR apparatus for an internal combustion engine which has a first turbocharger 203 and a second turbocharger 204. This apparatus is the subject of Japanese Patent Application HEI 3-27461, filed Feb. 21, 1991, by the present applicant. In the apparatus, a pressure in the diaphragm chamber 205b of the EGR valve 205 is controlled by the duty-control three-way vacuum switching valve (VSV) 207. Further, in order to obtain a fail-safe design of the three-way VSV 207 in the event of a failure at a full-open condition thereof, that is, in order to cut the EGR even if the VSV 207 causes a failure at an idling condition of the engine, a vacuum control valve (VCV) 208 is installed in a passage between the VSV 207 and the EGR valve 205.

More particularly, when the VSV operates normally, the EGR apparatus operates as follows:

At an idling condition of the engine where a throttle valve 201 is fully closed and a duty ratio value of the VSV 207 is 0%, a negative pressure generated in a surge tank 202 and transmitted through a port 202a is checked at the VSV 207 and is not transmitted to the EGR valve 205. The negative pressure in the surge tank 202 is transmitted through the port 202b to the VCV 208 to raise a diaphragm of the VCV to open an atmosphere communication port 208a. As a result, the atmospheric pressure from the intake conduit 212 is introduced into the diaphragm chamber 205b of the EGR valve 205 to close the EGR valve 205 and to cut the EGR.

At a low engine load condition in which the throttle valve 201 is partially open and the duty ratio value of the VSV 207 is about 30% (also partially open), the negative pressure of the surge tank 202 is transmitted to the EGR valve 205 through the VSV 207, an EGR valve modulator 206, and the VCV 208. In this instance, the port 202b is located upstream of the partially opened throttle valve and the atmospheric pressure is transmitted from the port 202b to the diaphragm chamber of the VCV 208 in order to close the atmosphere communication port 208a of the VCV 208. As a result, the negative pressure in the diaphragm chamber 205b of the EGR valve 205 is maintained, and the EGR valve 205 is open so that the EGR is conducted.

At a high engine load condition in which the throttle valve 201 is fully open and the duty ratio value of the VSV 207 is substantially 100% (fully open), the pressure in the surge tank 202 is approximately equal to or greater than the atmospheric pressure. The VSV 207 cuts communication of the EGR valve 205 with the surge tank 202 and causes the EGR valve 205 to communicate with the intake conduit 212, so that the atmospheric pressure from the intake conduit 212 is transmitted through the VSV 207 to the EGR valve 205 to close the EGR valve 205 and to cut the EGR.

When the VSV 207 causes a failure in the fully open condition thereof and the throttle valve 201 is fully closed, the negative pressure in the surge tank 202 is transmitted to the EGR valve 205 and may cause an engine stall, if the VCV 208 were not provided. However, at the fully close condition of the throttle valve 201, the negative pressure generated in the surge tank 202 is introduced, through the port 202b, into the diaphragm chamber of the VCV 208 to open the atmosphere communication port 208a of the VCV 208. An atmospheric pressure is introduced through the port 208a into the diaphragm chamber 205b of the EGR valve 205 to close the EGR valve 205. In this way, even if the VSV causes a failure, the EGR is cut at an engine idling condition to prevent an engine stall.

However, there are the following problems with the above-described EGR apparatus:

One problem is that when both the VSV 207 and the VCV 208 cause failures at the same time, that is, when the VSV 207 causes a failure at a fully open condition thereof and the VCV 208 causes a failure at a fully closed condition of the atmosphere communication port thereof, the EGR cannot be cut at an engine idling condition.

Another problem is that cutting of the EGR tends to be delayed because the VCV 208 installed in the passage increases the volume of the passage connecting the surge tank and the EGR valve, thus delaying the response, though the EGR should be cut swiftly when the throttle valve is closed.

SUMMARY OF THE INVENTION

An object of the invention is to provide an EGR apparatus for an internal combustion engine wherein the above-described problem associated with the double failure of the VSV and the VCV is overcome and a swift EGR cutting characteristic is obtained.

The above-described object can be achieved by an EGR apparatus for an internal combustion engine in accordance with the present invention by providing: an internal combustion engine having an intake conduit and an exhaust conduit, the intake conduit having a throttle valve installed therein; an EGR conduit connecting the exhaust conduit and the intake conduit bypassing the engine; an EGR valve installed in the EGR conduit, the EGR valve including a diaphragm chamber operating to open the EGR valve when a negative pressure lower than a predetermined negative pressure is introduced into the diaphragm chamber; a first passage having a first end connected to the intake conduit downstream of the throttle valve and a second end connected to the diaphragm chamber of the EGR valve; a second passage having a first end defining a connecting portion at which the first passage and the second passage are connected, and a second end communicating with the atmosphere; an EGR valve modulator installed in the first passage between the EGR valve and the connecting portion; a two-way solenoid valve installed in the first passage between the first end of the first passage and the connecting portion; and a fixed throttle disposed in the second passage.

In the above-described EGR apparatus, because no VCV is provided, the double failure problem of the VSV and the VCV is eliminated. Furthermore, because the volume of the passage connecting the surge tank and the EGR valve is decreased, the EGR cutting characteristic is improved.

BRIEF DESCRIPTION OF THE DRAWINGS

The above-described object and other objects, features, and advantages of the present invention will become more apparent and will be more readily appreciated from the following detailed description of the preferred embodiment of the invention taken in conjunction with the accompanying drawings, in which.

DETAILED DESCRIPTION OF THE PREFERRED EMBODIMENT

Figure 1:
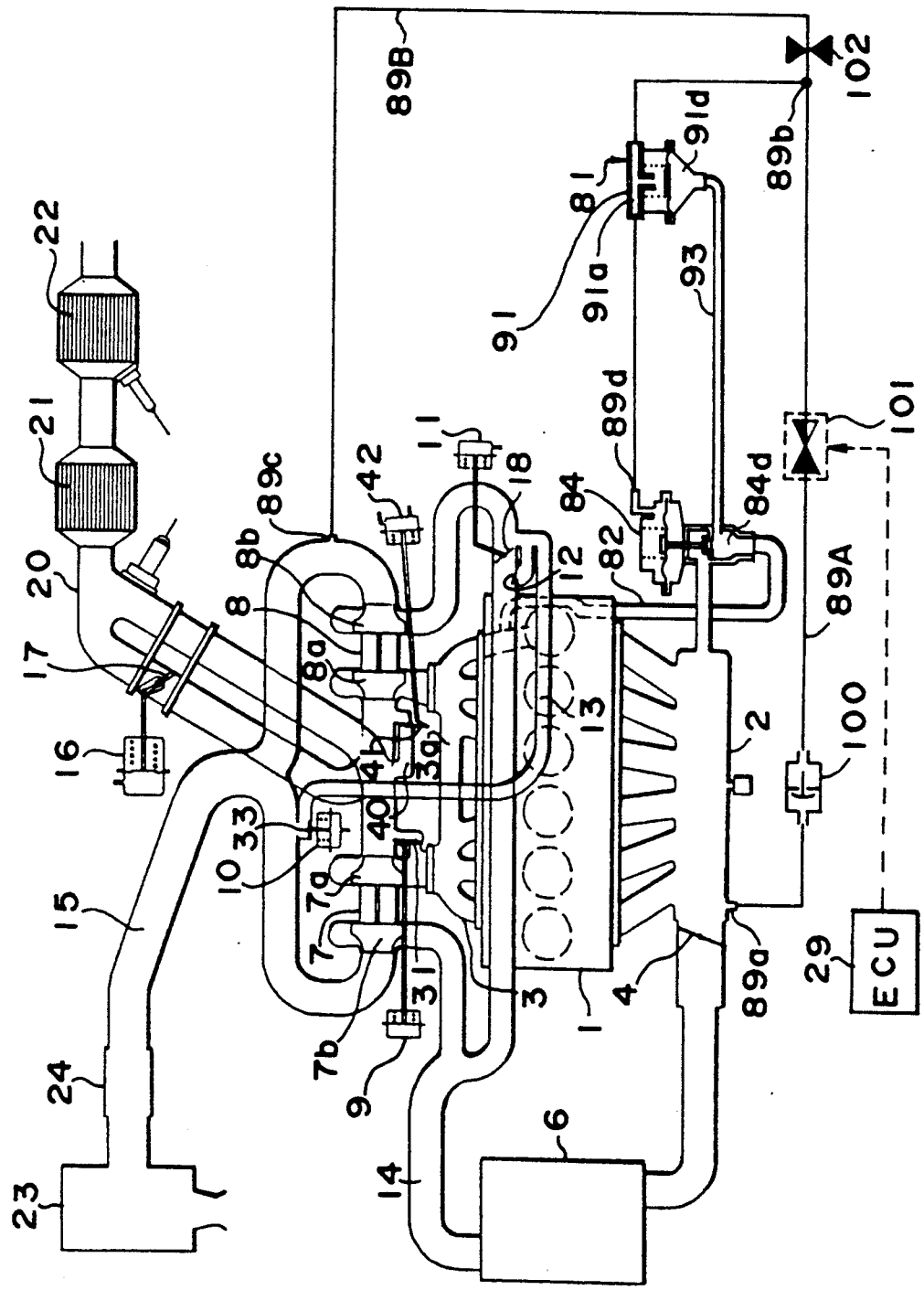
FIG. 1 is a schematic view of an EGR apparatus for an internal combustion engine in accordance with one embodiment of the invention.

As illustrated in FIG. 1, an EGR apparatus for an internal combustion engine in accordance with one embodiment of the invention includes an internal combustion engine, for example, a six-cylinder internal combustion engine with a dual turbocharger system, and an EGR apparatus 81. However, application of the EGR apparatus of the invention is not limited to turbocharged engines.

The cylinders of the engine 1 are separated into two groups. An exhaust manifold 3 is connected to the engine exhaust outlets. The exhaust manifold includes a first portion connected to a first group of the engine cylinders and a second portion connected to a second group of engine cylinders. The first and second portions of the exhaust manifold 3 communicate with each other via a connecting conduit 3a.

A first turbocharger 7 and a second turbocharger 8 are provided so as to be in parallel with one other with respect to the engine 1. The first turbocharger 7 is operated throughout all intake air quantities, and the second turbocharger 8 is operated only at large intake air quantities. The first turbocharger 7 includes a turbine 7a and a compressor 7b driven by the turbine 7a. Similarly, the second turbocharger 8 includes a turbine 8a and a compressor 8b driven by the turbine 8a. The turbine 7a is connected with the first portion of the exhaust manifold 3, and the turbine 8a is connected with the second portion of the manifold 3. As a result, the first and second turbines 7a and 8a are connected to the engine outlets via the exhaust manifold 3. The compressor 7b and the compressor 8b are connected to the air intake of the engine 1 via an intake line.

The intake line connected to the engine air intake includes a first intake passage positioned upstream of the compressors 7b and 8b and a second intake passage 14 positioned downstream of the compressors 7b and 8b. In the first intake passage 15, an air cleaner 23 and an air flow meter 24 are installed, in that order, in an intake air flow direction. An intercooler 6, a throttle valve 4, and an surge tank 2 are also installed, in the intake air flow direction, respectively, in the second intake passage 14.

An exhaust line 20, which is connected to the engine exhaust outlets, includes a first exhaust conduit connected to the first portion of the exhaust manifold 3, in which the turbine 7a is installed, a second exhaust conduit 20b connected to the second portion of the exhaust manifold 3, in which the turbine 8a is installed, and an exhaust pipe located downstream of a connecting portion of the first exhaust conduit and the second exhaust conduit. In the exhaust pipe, a catalytic converter 21 and an exhaust muffler 22 are installed in an exhaust gas flow direction, respectively.

For the purpose of switching the operation from a "one-turbocharger-operation," in which only the first turbocharger 7 is operated at small to medium intake air quantities, to a "two-turbocharger-operation," in which both the first turbocharger 7 and the second turbocharger 8 are operated at large air intake air quantities, an exhaust switching valve 17 is installed in the second exhaust conduit downstream of the turbine 8a, and an intake switching valve 18 is installed in the intake conduit downstream of the compressor 8b. When both the exhaust switching valve 17 and the intake switching valve 18 are closed, the operation of the second turbocharger 7 is stopped and only the first turbocharger 7 is in operation. In contrast, when both the exhaust switching valve 17 and the intake switching valve 18 are opened, both the first turbocharger 7 and the second turbocharger 8 are in operation.

For the purpose of minimizing the shock which typically accompanies the transition from a "one-turbocharger-operation" to a "two-turbocharger-operation," the second turbocharger 18 is run-up before it is fully rotated. An exhaust bypass conduit 40, which bypasses the exhaust switching valve 17, is provided. The running-up of the second turbocharger 8 is achieved by opening an exhaust bypass valve 41 installed in the exhaust conduit 40.

An intake bypass conduit 13 is provided to bypass the compressor 8b of the second turbocharger 8. An intake bypass valve 33 is installed in, and is adapted to open and close, the intake bypass conduit 13. When the second turbocharger 8 is preliminarily rotated, the intake bypass valve 33 is opened to minimize an intake air temperature increase.

The exhaust switching valve 17, the intake switching valve 18, the exhaust bypass valve 41, and the intake bypass valve 33 are operated by actuators 16, 11, 42, and 10, respectively, in accordance with instructions from an electronic control unit (ECU) 29.

The EGR apparatus 81 for the engine includes an EGR conduit 82 that connects the exhaust conduit 15 and the intake conduit 14 bypassing the engine 1; an EGR valve 84 installed in the EGR conduit 82 and having a diaphragm chamber 84a; a first passage 89A having a first end 89a connected to the intake conduit 14 downstream of the throttle valve 4 and a second end 89d connected to the diaphragm chamber 84a of the EGR valve 84; a second passage 89B having a first end defining a connecting portion 89b where the first passage 89A and the second passage 89B are connected and a second end 89c communicating with the atmosphere, for example, a portion of the intake conduit 15 upstream of the throttle valve 4; an EGR valve modulator 91 installed in the first passage 89A between the EGR valve 84 and the connecting portion 89b; a two-way solenoid valve 101 installed in the first passage 89A between the first end 89a of the first passage 89A and the connecting portion 89b; a fixed throttle 102 disposed in the second passage 89B; and a check valve 100 disposed in the first passage 89A between the first end 89a of the first passage 89A and the two-way solenoid valve 101.

Figure 2:
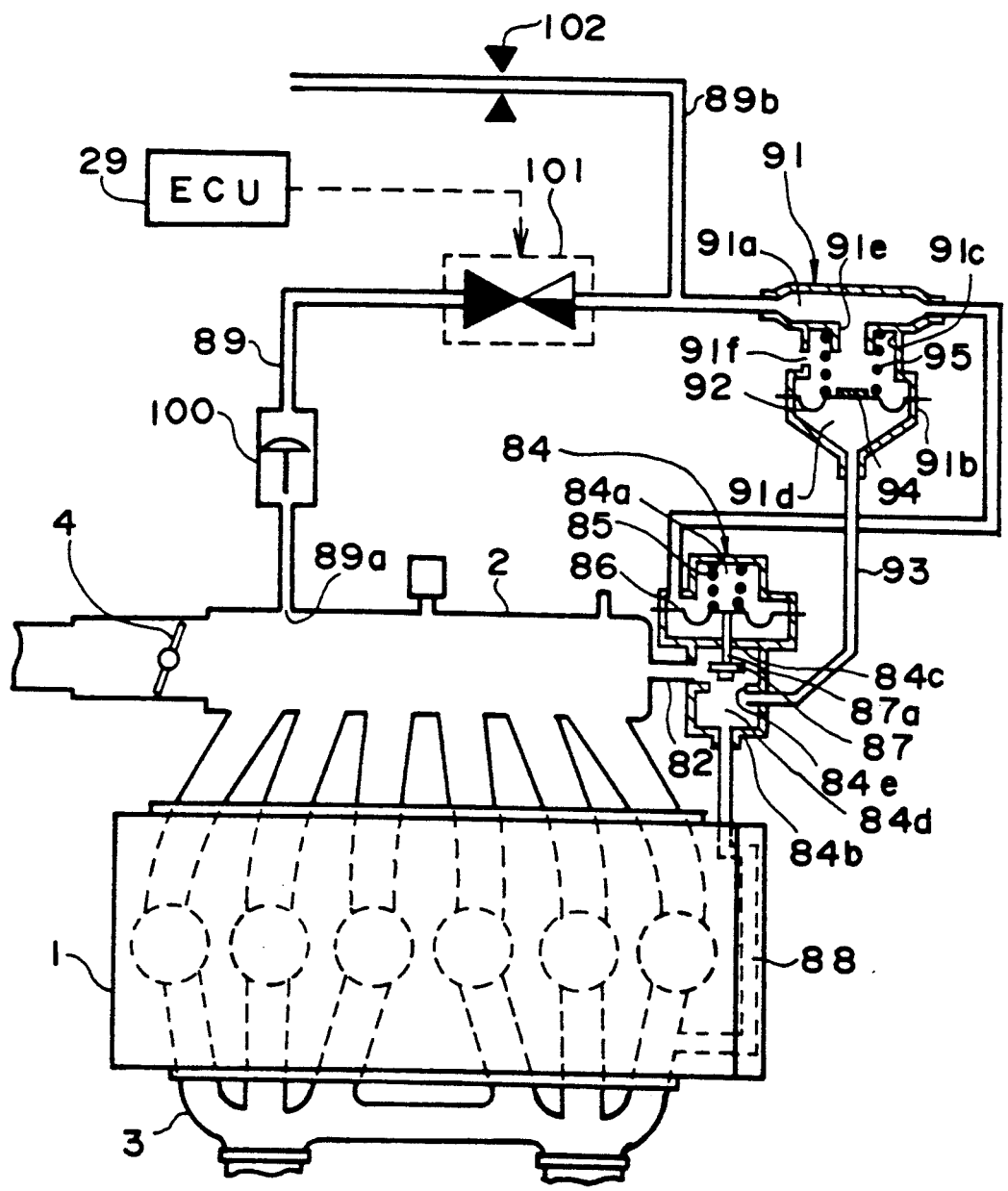
FIG. 2 is an enlarged cross-sectional view of an EGR valve and an EGR valve modulator of the apparatus of FIG. 1.
Figure 3:
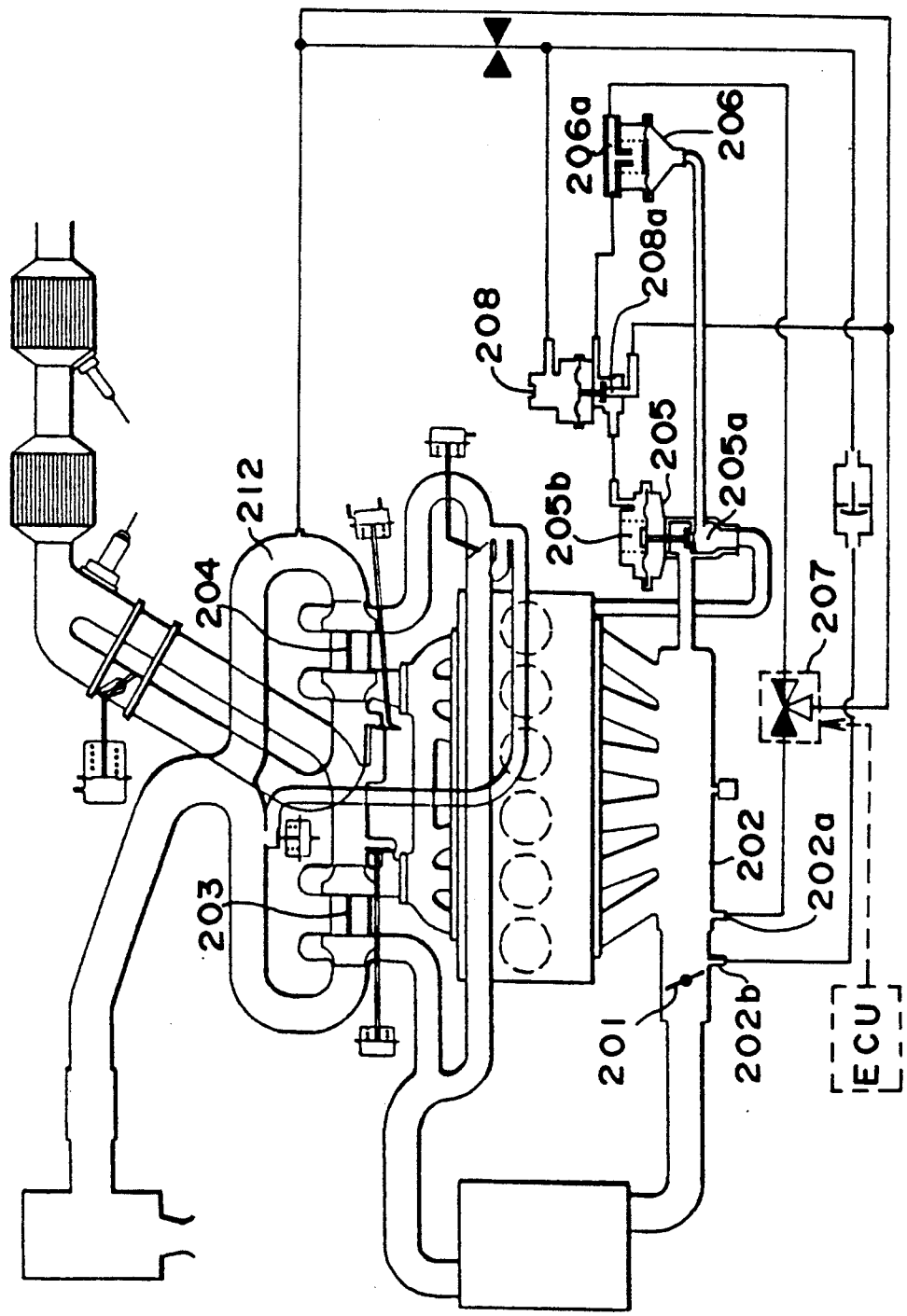
FIG. 3 is a schematic view of an EGR apparatus for an internal combustion engine described in Japanese Patent Application HEI 3-27461, filed Feb. 21, 1991.

As illustrated in FIG. 2, the EGR valve 84 includes a valve body 87 opening and closing the EGR conduit 82, a diaphragm 86 connected to the valve body 87 via a rod 87a and defining the diaphragm chamber 84a on one side of the diaphragm, and a spring 85 biasing the diaphragm 86 in a direction to close the EGR valve 84. The diaphragm chamber 84a operates to open the EGR valve 84 when a negative pressure lower than a predetermined negative pressure is introduced into the diaphragm chamber 84a. More particularly, the diaphragm chamber 84a operates to move the diaphragm 86 in a direction opposite to the biasing direction of the spring 85 to, in turn, open the EGR valve 84 when the highly negative pressure is introduced into the diaphragm chamber 84a.

The EGR conduit 82 has a first end connected to the exhaust manifold of the engine and a second end connected to the surge tank 2 downstream of the throttle valve 4. The EGR valve 84 is connected to the first end of the EGR conduit 82 via a hole 88 formed in the engine 1. The EGR valve 84 includes a chamber 84d defined between opposite walls 84b and 84c, and a partition formed in the chamber 84d and having a valve opening 84e which is opened and closed by the valve body 87.

The EGR valve modulator 91 includes an atmosphere communication port 91e allowing a chamber 91a included in the first passage 89A to communicate with the atmosphere through an aperture 91f formed in a wall 91c of the modulator when the atmosphere communication port 91e is open; a diaphragm 92 having a valve body 94 opening and closing the atmosphere communication port 91e; a spring 95 biasing the diaphragm 92 in a direction to open the atmosphere communication port 91e; and a diaphragm chamber 91d defined by a wall of the modulator 91b and the diaphragm 92. The diaphragm chamber 91d of the EGR valve modulator 91 communicates with the EGR conduit 82 via a conduit 93 so as to communicate with the exhaust conduit. The diaphragm chamber 91d operates to move the diaphragm 92 in a direction opposite to the biasing direction of the spring 95 to close the atmosphere communication port 91e when an exhaust gas pressure higher than a predetermined exhaust gas pressure is introduced into the diaphragm chamber 91d of the EGR valve modulator 91.

The spring constant of the spring 95 of the EGR valve modulator 91 is predetermined such that when the engine 1 is idling, and therefore the exhaust gas pressure is very low, the spring moves the diaphragm 92 in a direction away from the atmosphere communication port 91e to open the atmosphere communication port 91e. When the engine 1 is at low loads, and therefore the exhaust gas pressure is at a medium pressure, the spring 95 is compressed by the diaphragm 92 to close the atmosphere communication port 91e.

The two-way solenoid valve 101 comprises a duty-control valve and is operated in accordance with the instructions from the electronic control unit (ECU) 29. The duty-control value of the duty control valve 101 is predetermined such that when the engine 1 is at an idling speed and at high loads, the duty control valve 101 closes to cut transmission of the pressure generated in the intake conduit downstream of the throttle valve 4 to the diaphragm chamber 84a of the EGR valve 84. When the engine 1 is at low loads, the duty control valve 101 opens to allow the negative pressure generated in the intake conduit downstream of the throttle valve 4 to be transmitted to the diaphragm chamber 84a of the EGR valve 84.

A diameter of the fixed throttle 102 is determined such that when the two-way solenoid valve 101 causes a failure in a fully open condition thereof and the throttle valve 4 is closed, the negative pressure generated in the surge tank 2 and transmitted to the EGR valve 84 is sufficiently weakened by the atmospheric pressure introduced into the first passage 89A from the intake conduit through the fixed throttle 102, and therefore the EGR valve does not open. The thus determined diameter of the fixed throttle 102 is about 1 mm.

The check valve 100 installed in the first passage 89A allows gas to flow in the first passage 89A only in a direction from the two-way solenoid valve 101 to the first end 89a of the first passage 89A. The diaphragm of the EGR valve 84 and the diaphragm of the EGR valve modulator 91 are designed so as to endure a pressure equal to or lower than the atmospheric pressure. Thus, if a positive pressure greater than the atmospheric pressure acts on the diaphragms, the EGR valve 84 and the EGR valve modulator 91 may cause trouble. The check valve 100 checks transmission of a positive pressure from the surge tank 2 to the EGR valve 84 and the EGR valve modulator 91.

Operation of the EGR apparatus for an internal combustion engine will now be explained.

First, operation in a normal condition will be explained.

At an idling condition where the throttle valve 4 is fully closed and the duty ratio value of the two-way solenoid valve 101 is about 0%, the negative pressure (about −500 mm Hg) generated in the surge tank 2 is checked by the two-way solenoid valve 101 and is not transmitted to the EGR valve 84. An atmospheric pressure through the fixed throttle 102 from the intake conduit is transmitted to the EGR valve 84 to close the EGR valve 84. As a result, the EGR is cut.

At a low engine load condition in which the throttle valve 4 is partially open and the duty ratio value of the two-way solenoid valve 101 is about 30%, the negative pressure (about −400 mm Hg) generated in the surge tank 2 is transmitted through the two-way solenoid valve 101 to the EGR valve 84. In this instance, since the exhaust gas pressure is not low, the atmosphere communication port 91e of the EGR modulator 91 is closed by the exhaust gas pressure. The negative pressure from the surge tank 2 is partially weakened by the atmospheric pressure introduced from the intake conduit through the fixed throttle 102 and then is introduced into the EGR valve 84 to open the EGR valve 84. Thus, the EGR is conducted.

At a high engine load condition in which the throttle valve 4 is fully open and the duty ratio value of the two-way solenoid valve 4 is about 0%, the pressure substantially equal to or greater than the atmospheric pressure generated in the surge tank 2 is checked by the closed two-way solenoid valve 101 and is not transmitted to the EGR valve 84. The atmospheric pressure from the intake conduit through the fixed throttle 102 is transmitted to the EGR valve 84 to close the EGR valve 84. Thus, the EGR is cut.

Next, operation in a case in which the two-way solenoid valve 101 causes a failure in a fully open condition thereof and the throttle valve 4 is closed will be explained. The negative pressure (about −500 mm Hg) generated in the surge tank 2 is transmitted through the open two-way solenoid valve 101 to the connecting portion 89b where the negative pressure is weakened to about −100 mm Hg by the atmospheric pressure introduced from the intake conduit through the fixed throttle 102. The weakened negative pressure is further transmitted to the EGR modulator 91 where the negative pressure is further weakened by the atmospheric pressure introduced through the atmosphere communication port 91e. In this instance, when the throttle valve 4 is fully closed, the exhaust gas pressure is very low, and the atmosphere communication port 91e of the EGR valve modulator 91 is open. As a result, the negative pressure transmitted to the EGR valve 84 is very low in order to close the EGR valve 84. Thus, the EGR is cut and the safe fail is assured in the apparatus of the invention.

Because the VCV 208 provided to the conventional apparatus is not provided in the EGR apparatus of the present invention and the fixed throttle 102 is provided close to the connecting portion 89b, the volume of the passage of the EGR apparatus is decreased. As a result, the EGR is swiftly cut when the throttle valve 4 is fully closed. Therefore, the EGR cutting characteristic is improved.

In accordance with the invention, because the VCV 208 is deleted from the EGR apparatus and the three-way VSV 207 is replaced by a combination of the two-way solenoid valve 101 and the fixed throttle 102, the problem of non-cutting of the EGR at the double failure of the VSV and the VCV does not occur, the EGR cutting is improved, and the manufacturing cost of the EGR apparatus is decreased.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. An EGR apparatus for an internal combustion engine comprising:
   an internal combustion engine having an intake conduit and an exhaust conduit, the intake conduit having a throttle valve installed therein;
   an EGR conduit connecting the exhaust conduit and the intake conduit bypassing the engine;
   an EGR valve disposed in the EGR conduit, the EGR valve including a diaphragm chamber operating to open the EGR valve when a negative pressure lower than a predetermined negative pressure is introduced into the diaphragm chamber;
   a first passage having a first end connected to the intake conduit downstream of the throttle valve and a second end connected to the diaphragm chamber of the EGR valve;
   a second passage having a first end defining a connecting portion where the first passage and the second passage are connected and a second end communicating with atmosphere;
   an EGR valve modulator disposed in the first passage between the EGR valve and the connecting portion;
   a two-way solenoid valve disposed in the first passage between the first end of the first passage and the connecting portion; and
   a fixed throttle disposed in the second passage.

2. An EGR apparatus according to claim 1, wherein the EGR valve includes:
   a valve body opening and closing the EGR conduit;
   a diaphragm connected to the valve body;
   a spring biasing the diaphragm in a direction to close the EGR valve, the diaphragm chamber operating to move the diaphragm in a direction opposite to the biasing direction of the spring to open the EGR valve when the negative pressure is introduced into the diaphragm chamber.

3. An EGR apparatus according to claim 1, wherein the EGR valve modulator includes:
   an atmosphere communication port allowing the first passage to communicate with atmosphere when the atmosphere communication port is open;
   a diaphragm opening and closing the atmosphere communication port;
   a spring biasing the diaphragm in a direction to open the atmosphere communication port;
   a diaphragm chamber of the EGR valve modulator communicating with the EGR conduit to communicate with the exhaust conduit and operating to move the diaphragm in a direction opposite to the biasing direction of the spring to close the atmosphere communication port when an exhaust gas pressure higher than a predetermined exhaust gas pressure is introduced into the diaphragm chamber of the EGR valve modulator.

4. An EGR apparatus according to claim 3, wherein a spring constant of the spring of the EGR valve modulator is predetermined such that when the engine is at an idling speed, and therefore the exhaust gas pressure is at a low pressure, the spring moves the diaphragm of the EGR valve modulator to open the atmosphere communication port, and when the engine is at low loads, and therefore the exhaust gas pressure is at a medium pressure, the spring is compressed by the diaphragm of the EGR valve modulator to close the atmosphere communication port.

5. An EGR apparatus according to claim 1, wherein the two-way solenoid valve comprises a duty-control valve, a duty-control value of the duty control valve being predetermined such that when the engine is at an idling speed and at a high load, the duty control valve closes to cut transmission of the pressure generated in the intake conduit downstream of the throttle valve to the diaphragm chamber of the EGR valve, and when the engine is at a low load, the duty control valve opens to allow the negative pressure generated in the intake conduit downstream of the throttle valve to be transmitted to the diaphragm chamber of the EGR valve.

6. An EGR apparatus according to claim 1, wherein a diameter of the fixed throttle is about 1 mm.

7. An EGR apparatus according to claim 1, wherein the fixed throttle is disposed in close proximity to the connecting portion.

8. An EGR apparatus according to claim 1, wherein the second end of the second passage is connected to a portion of the intake conduit upstream of the throttle valve.

9. An EGR apparatus according to claim 1, further comprising a check valve disposed in the first passage between the first end of the first passage and the two-way solenoid valve, the check valve allowing gas to flow in the first passage only in a direction from the two-way solenoid valve to the first end of the first passage.

10. An EGR apparatus according to claim 1, wherein the engine includes a dual turbocharger system, the dual turbocharger system including a first turbocharger having a first turbine and a first compressor and a second turbocharger having a second turbine and a second compressor, the EGR conduit being connected to a portion of the exhaust conduit upstream of the first and second turbines and being connected to a portion of the intake conduit downstream of the first and second compressors.

* * * * *